Jan. 12, 1943.          H. HOOVER, JR           2,307,790
                AUTOMATIC AMPLITUDE CONTROL SYSTEM
                       Filed July 26, 1939

INVENTOR.
HERBERT HOOVER JR.
BY
Lippincott & Metcalf
ATTORNEYS.

Patented Jan. 12, 1943

2,307,790

UNITED STATES PATENT OFFICE 2,307,790

AUTOMATIC AMPLITUDE CONTROL SYSTEM

Herbert Hoover, Jr., Sierra Madre, Calif., assignor to Consolidated Engineering Corporation, Pasadena, Calif., a corporation of California Application July 26, 1939, Serial No. 286,646

6 Claims. (Cl. 179—170)

My invention pertains to amplifiers using automatic amplitude control and is particularly applicable to amplifiers used in seismic prospecting.

The main object of my invention is to provide means for varying the gain of an amplifier as a function of output signal strength without encountering regeneration or instability.

Another object of my invention is to provide a stabilized automatically amplitude controlled amplifier suitable for use in seismic prospecting.

Still another object of my invention is to provide an automatically amplitude controlled amplifier wherein the frequency bands of amplifier and volume control circuits overlap by a predetermined amount, and to provide such an automatic amplitude control circuit with stabilized feedback in the overlapping range.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus, of the present application, as I may adopt various other apparatus embodiments, utilizing the method, within the scope of the appended claims.

My invention is particularly applicable to seismic prospecting, as in seismic prospecting the range of frequencies which must be amplified overlaps the range of frequencies that must pass through the automatic amplitude control return circuit in order to maintain automatic amplitude control action satisfactory for good recording throughout the entire frequency range of seismic waves.

Figure 1:
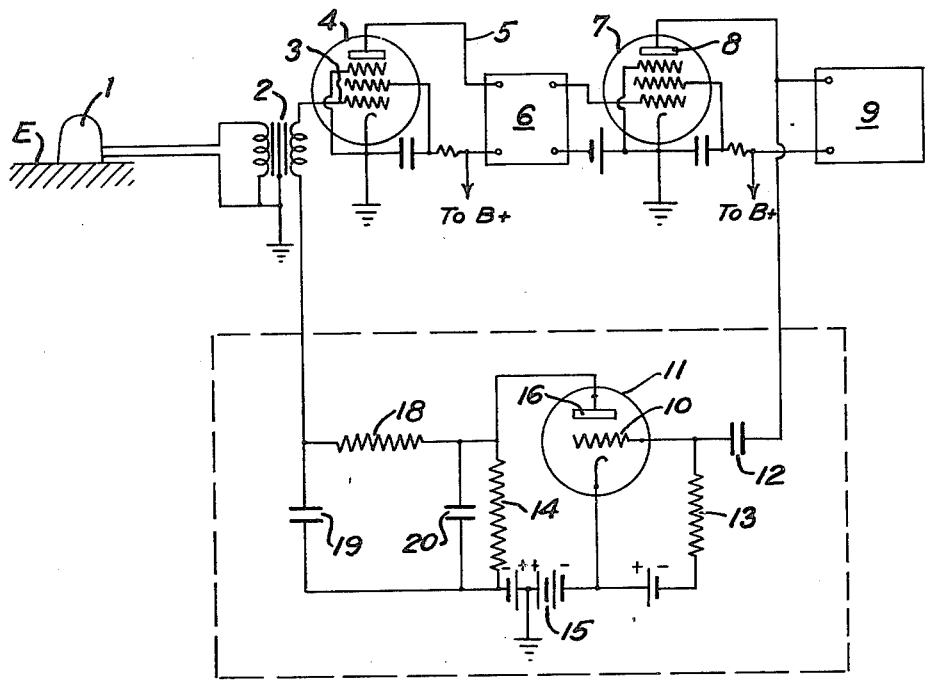
Fig. 1 is a schematic diagram of an amplifier to which automatic amplitude control is applied according to my invention.

Referring to Fig. 1, a receptor such as that described in applicant's co-pending patent application Serial No. 287,073, I positioned on the ground E receives seismic waves, generated, usually artificially, by an explosion or by similar impact, as is well known in the art. Currents generated by receptor I are passed through an input transformer 2 and applied to grid 3 of amplifier tube 4. The output of amplifier tube 4 is passed through anode circuit 5 into band pass filter 6 which is adjusted to pass the desired band of frequencies used in seismic prospecting, say for example, from 25 to 150 cycles per second. The output of the band pass filter 6 is applied to output tube 7, anode 8 of which is connected to a recorder or other reproducing apparatus 9 as is well known in the art.

A portion of the output from the output tube 7 is also applied to grid 10 of an automatic amplitude control tube 11 through capacity 12 and resistor 13. Said control tube both amplifies and rectifies signals impressed on grid 10. The output current of automatic amplitude control tube 11 passes through output resistor 14 and through the usual anode battery 15. Connected directly to anode 16 of automatic amplitude control tube 11 is a series filter resistor 18 having grounded capacities 19 and 20 on each side thereof. The combination of output resistor 14, series resistor 18 and capacities 19 and 20 form a low pass filter which I so proportion as to pass a frequency band having only a small and predetermined overlap with the frequency band of the main amplifier. The reason for this overlap is pointed out below. The output of the above recited filter is fed to grid 3 of amplifier tube 4 through the secondary of transformer 2.

In seismic prospecting the useful band of frequencies usually lies between about 25 and 150 cycles. Since it is not practical to employ filters having exceedingly sharp cut off characteristics, the amplifier system will still have some response to frequencies as low as 10 or 15 cycles even though in this frequency range the response is greatly reduced.

The changes of amplitude in received seismic waves may vary at the average rate of 20 to 30 db. per second, and it is desirable that the automatic amplitude control be capable of correcting the amplifier gain accordingly. In Fig. 1 the speed of automatic amplitude control operation is determined by the constants in the circuit elements 14, 18, 19, and 20. This circuit also smooths out A. C. components from the D. C. control voltage applied to grid 3 of tube 4. The function of this filter is to pass D. C. voltage which may be varying at the equivalent rate of 5 cycles per sec. and lower in order to correct for changes in the average amplitude of the incoming waves, and to attenuate all ripple frequencies of about 5 cycles and above in order to prevent them from being superimposed upon the signal grid 3 of tube 4. Again it is not practical to employ exceedingly sharp filters, and as a result some ripple will be present in the range of from 10 to 15 cycles even though greatly reduced.

In order to produce satisfactory recording of seismic waves therefore, it is necessary that the pass band of the automatic amplitude circuit overlap the pass band of the main amplifier channel. Even though the frequencies common to both circuits are outside the normal range of seismic frequencies, nevertheless amplifier instability will be experienced unless special precautions are taken. My invention prevents such instability by utilizing negative or stabilized feedback in the overlapping region.

Figure 2:
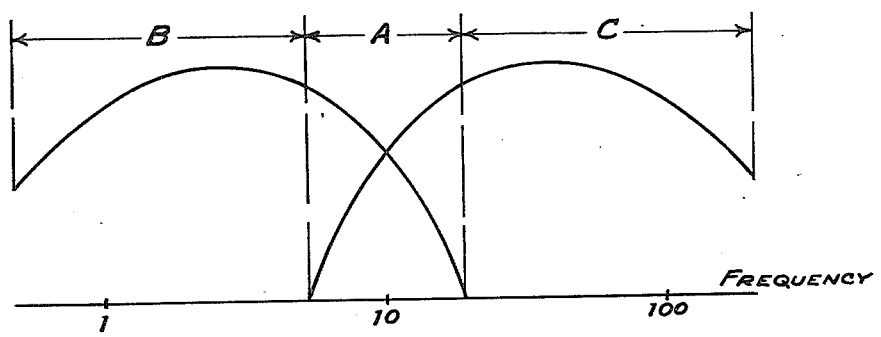
Fig. 2 is a graph illustrating the frequency amplitude characteristics of an amplifier and its associated automatic amplitude control circuit.

In Fig. 2, I have shown one preferred relationship of main amplifier pass band to the pass band of the automatic amplitude circuit with the common overlap region shown as being from about 5 to 15 cycles.

It will be noticed that I have delineated three areas in the curves shown in Fig. 2. In area A the two frequency bands overlap, and in this region the frequencies to which both amplifier and automatic amplitude control circuit respond, are generally common as far as significant amplitudes are concerned. Area C represents the frequency band passed substantially only by the main amplifier.

It can be seen readily that while there will be automatic amplitude control there can be no regeneration or oscillation in area C, because the automatic amplitude control circuit does not pass any significant part of waves with frequencies in this area. It can also be seen that there will be no regeneration or oscillation in area B because the main amplifier does not amplify to any significant degree at these frequencies. In the areas B and C the all around gain through the amplifier and automatic amplitude control circuit is too small to produce instability.

However, in area A the all around gain, which is the product of amplifier gain and gain through the automatic amplitude control circuit may be sufficient to introduce over-all instability. To preclude the possibility of instability arising from sustained oscillations or regeneration in the overlapping region, I utilize negative feedback through the automatic amplitude control circuit. By using appropriate feedback through the automatic amplitude control circuit, I avoid phase relations which would tend to produce oscillation or regeneration. In the example shown in Fig. 1, I achieve this result by taking advantage of the change of polarity experienced by a signal which passes through the three amplifier tubes 4, 7, and 11.

Thus, I have been able to produce an amplifier having an automatic amplitude control circuit which is stable at all frequencies over which I desire to operate and in which the speed of response of the automatic amplitude control circuit corresponds to the rate of change of amplitudes likely to be encountered in seismic prospecting.

I claim:

1. In an amplifier having an input and an output, band pass filtering means connected intermediate said input and said output designed to pass waves lying within an extended frequency range, an automatic amplitude control circuit responsive to output signals and adapted to produce gain control voltages having an alternating current component superimposed on a direct current component, said component having a frequency lying in said range, and a circuit connected to apply said gain control voltages to a gain control element in said amplifier preceding said filtering means to vary the gain of said amplifier as an inverse function of the output signal strength, said circuit including means providing a negative feedback connection for waves of a frequency lying in a portion of said extended range at the low frequency end thereof while simultaneously acting as a filter which attenuates any component of a frequency in the remaining portion of said range regardless of phase shift in said remaining portion to such a degree that the all around gain through the amplifier and automatic volume control circuit lies below the point of regenerative instability in said remaining portion.

2. In an amplifier having an input and an output, filtering means in said amplifier adapted to pass some waves lying in a range above a predetermined frequency, and to attenuate to a limited extent waves lying below said predetermined frequency, an automatic volume control circuit which develops direct current potential in accordance with the amplitude of the signals appearing in the output, means for applying said direct current potential to said amplifier to vary the gain of said amplifier inversely as a function of output signal strength and to simultaneously maintain a negative feedback relationship through said amplifier and said control circuit in a common frequency range below said predetermined frequency, said means including a filter for attenuating waves of a frequency above said predetermined frequency regardless of the phase shift for said higher frequency portion to such an extent that regenerative instability does not occur above said frequency.

3. In operating an amplifier having an input and output and adapted to amplify signal waves having frequencies in a selected range, the method of preventing regenerative instability regardless of the input to output phase relation of the higher signal frequencies, which comprises automatically controlling the amplification of said amplifier by feeding back highly attenuated signal energy in the higher frequency portions of the range of wave frequencies passed by said amplifier regardless of the phase shift for said higher frequency portion, while feeding back from said output to said input wave energy present in the lower frequency portion of said range with less attenuation and in negative feedback relationship to produce regeneration-free stable operation of said amplifier over the entire frequency range passed by said amplifier.

4. In operating an amplifier having an input and an output and adapted to amplify signal waves having frequencies in a selected range, and having a feedback circuit connecting the input to the output, said circuit including an automatic volume control means, the method of preventing regenerative instability due to fluctuations in control voltage at a frequency in said range regardless of the input to output phase relation of the higher signal frequencies, which comprises highly attenuating signal energy in the feedback circuit in the higher frequency portions of the range of wave frequencies passed by said amplifier regardless of the phase shift for said higher frequency portion, while feeding back through said circuit output wave energy present in the lower frequency portion of said range with less attenuation and in negative feedback relationship to produce regeneration-free stable operation of said amplifier over the entire frequency range passed by said amplifier.

5. In operating an amplifier having an input and an output and adapted to amplify signal waves having frequencies in a selected range, and an automatic volume control circuit connecting the input to the output, the method of preventing regenerative instability due to fluctuations in control voltage at frequencies in said range reaching the input, regardless of the input to output phase relation at the higher signal frequencies, which comprises highly attenuating components of said fluctuations in the higher frequency portions of the range of wave frequencies passed by said amplifier regardless of the phase shift for said higher frequency portion, while feeding back to the input components of said fluctuations present in the lower frequency portion of said range with less attenuation and in negative feedback relationship to produce regeneration-free stable operation of said amplifier over the entire frequency range passed by said amplifier.

6. In an amplifier having an input and an output, filtering means in said amplifier adapted to pass some waves lying in a range above a predetermined frequency and to attenuate to a limited extent waves lying below said predetermined frequency, an automatic volume control circuit including an amplifying tube having a plate circuit and a grid circuit operating to develop direct current potential in said plate circuit in accordance with signals applied to said grid circuit, means for applying signals to said grid circuit substantially in phase with signals appearing in the amplifier output, means for applying said direct current potential to said amplifier to vary the gain of said amplifier inversely as a function of output signal strength and to simultaneously maintain a negative feedback relationship through said amplifier and said control circuit in a common frequency range below said predetermined frequency, said last means including a filter for attenuating waves of a frequency above said predetermined frequency to such an extent that instability does not occur above said frequency, regardless of phase shift above said frequency.

HERBERT HOOVER, JR.